April 23, 1929.  J. R. GAMMETER  1,710,211
METHOD OF CUTTING SHEET RUBBER
Filed July 20, 1927  3 Sheets-Sheet 1

Inventor
John R. Gammeter
By Willard D. Eakin
Atty.

April 23, 1929.  J. R. GAMMETER  1,710,211
METHOD OF CUTTING SHEET RUBBER
Filed July 20, 1927   3 Sheets-Sheet 3

Inventor
John R. Gammeter
By Willard D. Eakin
Atty.

Patented Apr. 23, 1929.

1,710,211

UNITED STATES PATENT OFFICE.

JOHN R. GAMMETER, OF AKRON, OHIO, ASSIGNOR TO A. G. SPALDING AND BROS., A CORPORATION OF NEW JERSEY.

METHOD OF CUTTING SHEET RUBBER.

Application filed July 20, 1927. Serial No. 207,138.

This invention relates to methods of cutting rubber and especially for cutting sheet rubber into strips, such as the rubber thread employed in the winding of golf balls, for example.

My chief objects are to provide improved procedure for cutting sheet rubber; especially to provide improved procedure and apparatus for cutting rubber while it is in an unvulcanized condition; to provide for vulcanizing strip-rubber stock without the use of a large vulcanizing space and without resorting to elaborate procedure or apparatus for supporting it during the vulcanization; to provide in an improved manner for maintaining the cut strips in orderly arrangement - in the handling thereof and during the vulcanizing period as to strips that are cut from unvulcanized stock and then vulcanized in strip form; to provide uniformity and a desirable cross-sectional form in the vulcanized strips; to provide for simultaneously cutting a large number of strips from a single sheet of rubber without such distortion of the strips laterally as they are cut as to result in binding of the strips against the cutting means and non-uniformity of cross-section in the strips; to provide regular and uniform separation of the strips at the cutting position and the application of an adhesion-preventing material to the strips before they are again brought into contact with each other; and to provide other, more detailed advantages which will be manifest.

Figure 1:
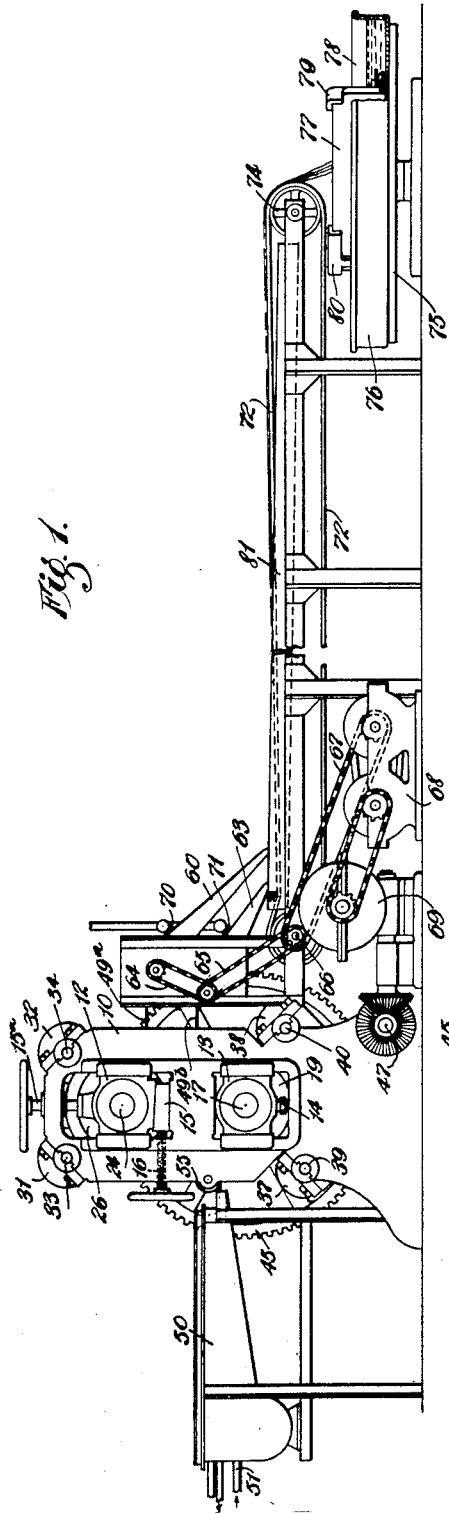
Fig. 1 is a side elevation of apparatus adapted to carry out my invention in its preferred form.
Figure 2:
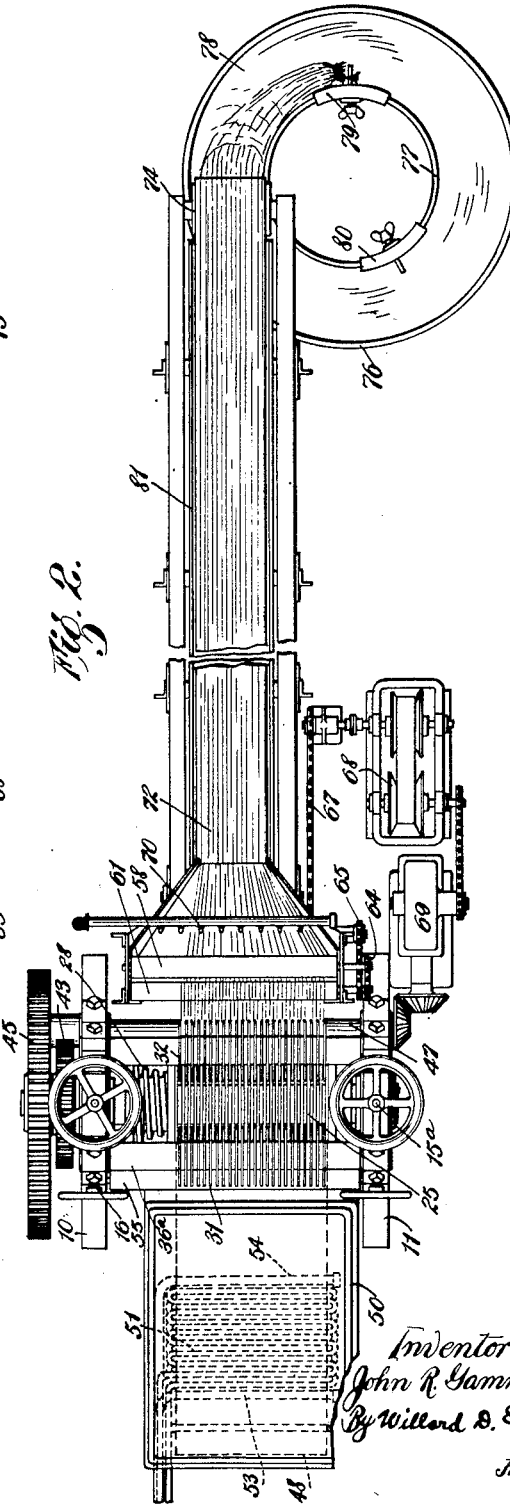
Fig. 2 is a plan view of the same.

Referring to the drawings, the apparatus comprises a frame including a pair of end standards 10, 11, each formed with vertical guide-ways for a pair of journal blocks 12, 13. Each of the lower journal blocks, 13, is supported against the top of its guide-way by a supporting screw 14 threaded into the floor of the guide-way, and each of the upper journal blocks, 12, is supported by a wedge 15 interposed between the lower face of the block and the floor of the guide-way and provided with an adjusting-screw 16 threaded through a portion of the end standard and swiveled in the wedge. For holding the block down upon the wedge and for lifting the journal block to facilitate the adjustment of the wedge, the block is provided with a screw 15ª, threaded through an arch portion of the end standard and swiveled in the block.

Figure 3:
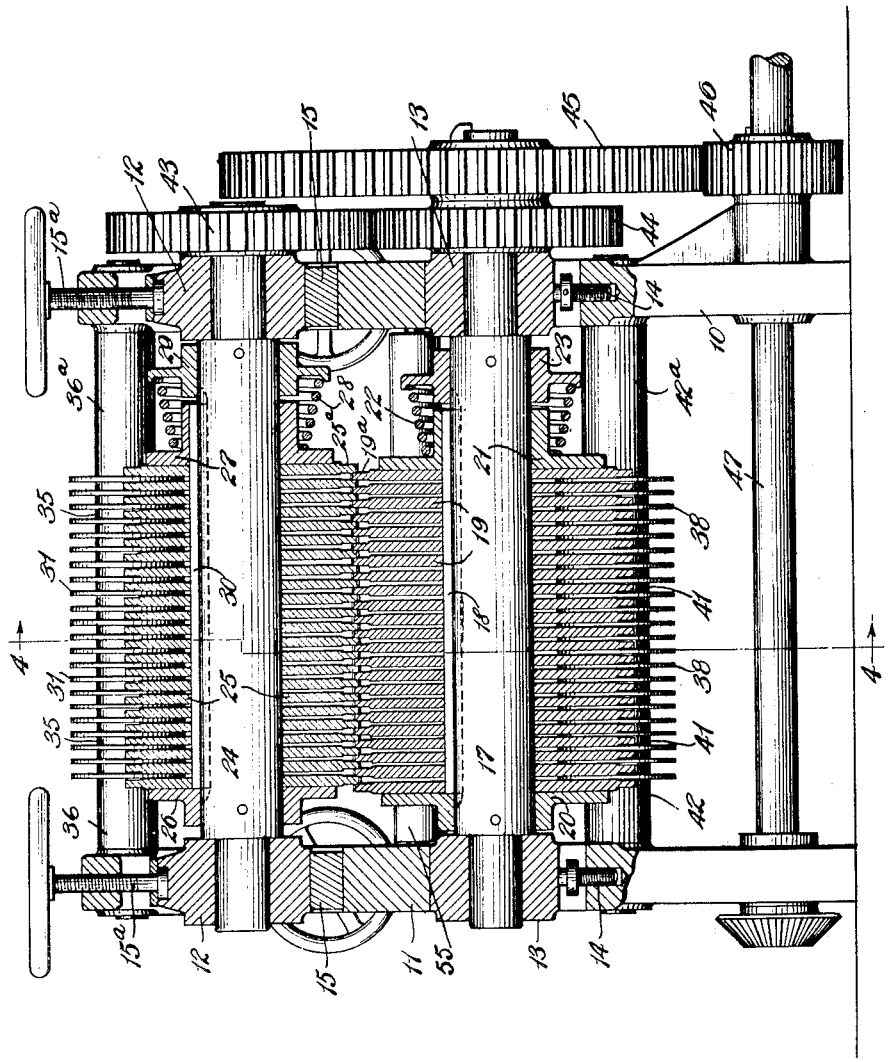
Fig. 3 is a vertical, transverse section of the apparatus at the position of the cutters.
Figure 4:
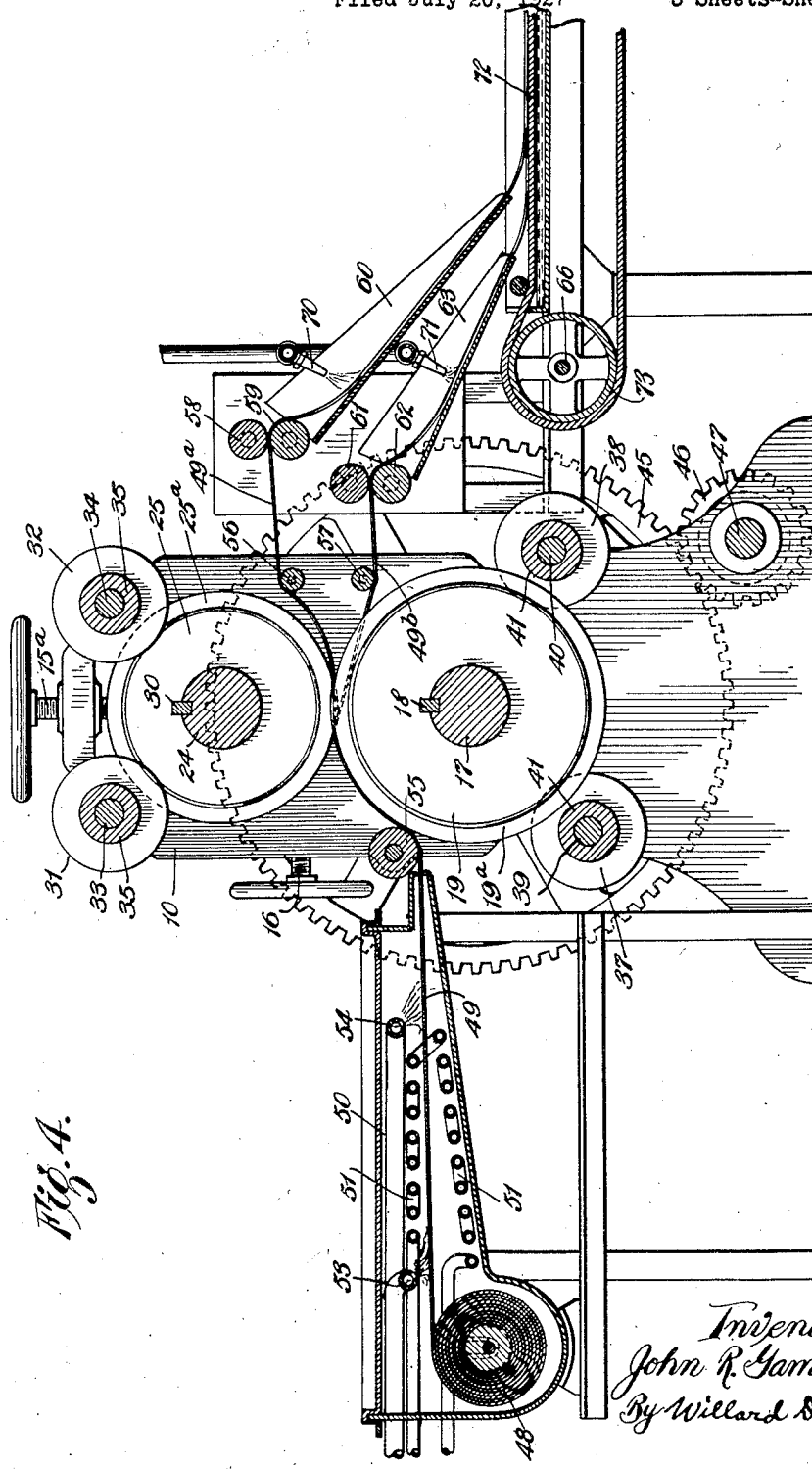
Fig. 4 is a section on line 4—4 of Fig. 3.

In the lower journal blocks is journaled a shaft 17, upon which are slidably keyed, by means of a key 18, a series of cutter disks 19, 19, interposed between a flanged collar 20 secured upon the shaft near one of the end standards and a flanged collar 21 slidably mounted upon the shaft 17 and key 18, and urged toward the collar 20 to maintain the cutter disks in closely-assembled relation by a compression spring 22 (Fig. 3) interposed between the collar 21 and a flanged collar 23 pinned upon the shaft.

In the upper journal blocks, 12, is journaled a shaft 24 upon which is similarly mounted a series of cutter disks 25, 25, between a collar 26 fixed upon the shaft and a collar 27 slidably mounted on the shaft and backed by a compression spring 28 bearing against a collar 29 secured upon the shaft, the key by which the disks 25 and collar 27 are secured against relative rotation upon the shaft being shown at 30.

Each of the cutter disks 19 and 25 is formed with an annular marginal zone, 19ª or 25ª, of less thickness than the rest of the disk. The shafts 17 and 24 are so spaced apart with relation to the size of the disks that the disks 25 upon the upper shaft slidably overlap the disks 19 on the lower shaft, the disks of the upper shaft alternating with those of the lower shaft, so that the margins of the disks of each set space apart the disks of the other set and are adapted to coact therewith as non-beveled, rotary shears, the outer edge faces of the several disks being cylindrical, and the springs 22 and 28 being adapted to hold the two series of disks in firm shearing relation to each other.

To maintain the disks of the upper series at right angles to their shaft notwithstanding the force of the spring 28, two series of spacer disks 31, 31 and 32, 32 are rotatably mounted upon respective shafts 33, 34 mounted on the end standards 10 and 11, and spacing collars such as the collars 35, 35 and 36, 36ª are rotatably mounted upon each of the shafts 33, 34 for maintaining the spacer disks in right-angled relation to the shaft. The peripheries of the spacer disks 32 extend into the spaces between the relatively thick main body portions of the cutter disks 25, so as not to contact the shearing edges of the cutter disks. The two sets of spacer disks 31 and 32 are spaced apart from each other circumferentially of the series of cutter disks so that, with the cutter disks of the lower set, the disks 31, 32 give the cutter disks 25 three-point spacer contact.

For similarly spacing the cutter disks 19 of the lower set, two series of spacer disks 37, 37 and 38, 38 are rotatably mounted upon respective shafts 39, 40, and held in spaced relation thereon by spacing collars such as the collars 41, 41 and 42, 42ª.

The shafts 17 and 24 are provided with inter-meshed drive gears 43, 44, and the shaft 17 has drive connection, through gears 45, 46 and a main drive shaft 47, with a suitable source of power (not shown).

The rubber, especially in the case of unvulcanized rubber, is preferably frozen or so cooled as to reduce its deformability and resilience and, in the case of unvulcanized rubber, to reduce its tackiness, thus to facilitate the cutting. Unvulcanized stock either may be drawn to the cutter directly from the calender and frozen or chilled on its way to the cutter, or may be frozen or substantially frozen in the form of a roll, such as the stock roll 48, and fed from the roll to the cutter. Alternatively, the unvulcanized rubber may be drawn from a stock roll at room temperature and frozen or chilled on its way to the cutter.

The sheet of stock to be cut is shown at 49, and for freezing the stock or for preserving its low temperature on its way to the cutter a chamber member 50 is mounted for the passage of the stock therethrough and is provided with cooling means such as the refrigerating coil 51, or with carbon dioxide spray nozzles 53, 54, or with both. I preferably cut the unvulcanized rubber at a temperature of about $-20°$ F. and vulcanized rubber at a temperature of $-60°$ to $-80°$ F.

For guiding the sheet 49 onto the peripheries of the lower set of cutter disks 19, and for holding the stock in driving contact therewith, a guide and presser roll 55, adapted to coact with the disks, is journaled between the end standards.

For separating alternate strips 49ª, 49ª of the cut stock from the intervening strips 49ᵇ, 49ᵇ, a guide roll 56 is journaled between the end standards at the delivery side of the cutter and adapted to have drawn thereover the upper set of strips, 49ª, which are forced upward between the upper disks 25 in the cutting operation, and a guide roll 57 is journaled between the end standards in a suitable position for the alternate strips, 49ᵇ, forced downward between the the lower cutter disks 19 in the cutting operation, to be drawn thereunder, so that the two sets of strips, 49ª and 49ᵇ, are fed from the cutter in different directions, corresponding to the positions to which they are forced in the cutting operation, such separating of the two sets of strips resulting in the strips of each set being spaced well out of contact with each other as they pass the respective guide rolls 56 and 57.

A pair of feed rolls 58, 59 are mounted at the delivery side of the cutter and adapted to draw the upper set of strips therefrom and feed them into a chute 60, and a pair of feed rolls 61, 62 are similarly mounted for drawing the lower set of strips from the cutter and feeding them to a chute 63, the roll 59 having drive connection with the roll 62 through a sprocket chain 64, and the roll 62 having drive connection, through a sprocket chain 65, shaft 66, sprocket chain 67, variable-speed drive device 68, and a reduction gear 69 (see Fig. 1), with the main drive shaft 47. Mounted in position to discharge onto the strips as they pass through the chutes 60 and 63 an adhesion-preventing material such as French chalk and water, are spray nozzles 70, 71.

For receiving the strips as they pass from the chutes, a conveyor belt 72 is mounted upon a pair of end rolls 73, 74, of which the roll 73 is mounted upon the shaft 66. The chutes 60 and 63 are of downwardly tapered form such as to bring closely together the strips of the respective sets drawn therethrough, the liquid from the spray nozzles 70 and 71 preventing adhesion of the strips as they come into contact on the conveyor belt 72.

Rotatably mounted upon a standard 75, in position to receive the strips from the delivery end of the conveyor 72, is a pan 76 formed with a high annular flange 77 adapted for the winding of the assemblage of strips thereon, and constituting the inner wall of an annular channel 78 adapted to receive the strips and retain adhesion-preventing material in association therewith.

Means such as the clamps 79, 80 are provided upon the annular flange 77 for anchoring the ends of an assemblage of the strips to maintain the strips in orderly arrangement and prevent retraction thereof during the vulcanizing operation.

For receiving excess adhesion-preventing material from the chutes 60 and 63 and conducting it into the pan 76, a trough 81 is mounted in association with the upper reach of the conveyor belt 72.

In the practice of my method by the use of the apparatus herein described the sheet 49, which may be of either vulcanized or unvulcanized rubber, is drawn from a suitable source of supply, which may be the stock roll 48, in either frozen or unfrozen condition, and the sheet is threaded between the guide and presser roll 55 and the lower set of cutter disks 19 and into the bight of the two sets of cutter disks. The machine is then driven, which causes the cutter disks to cut the stock into the two sets of strips, 49$^a$ and 49$^b$, the strips of each set being sheared from those of the other set by a true shearing action and each strip being supported on the cylindrical outer face of one of the cutter disks in the shearing action. Because of the non-beveled form of the disks the inter-disk spaces into which the strips are forced are as wide respectively as the strips, so that each strip is sheared without lateral crowding or deformation of the strip.

Each strip is forced, by the cylindrical disk-face on which it rests, out of the plane of the strips of the other set, which results in each strip being spaced apart from adjacent strips of the same set as well as from those of the other set, and from the positions to which the strips are thus forced the two sets of strips are led over the respective guide rolls 56, 57 and between the respective pairs of feed rolls 58, 59 and 61, 62, which feed them to the respective chutes 60, 63 from which they are drawn by the conveyor belt 72 and fed, as to unvulcanized strips, into the pan 76, which is suitably rotated, permissibly by hand, to wind the assemblage of strips upon the annular flange 77, within the annular channel 78 of the pan, the two sets of strips being brought back into association with each other as they pass onto the conveyor belt 72. As the strips pass down the chutes 60, 63, in the case of unvulcanized strips, an adhesion preventing material, preferably a mixture of French chalk and water or other material adapted to prevent adhesion of the strips while they are submerged in water, is discharged onto them.

Preferably the strips are tied together at the leading end of the assembly and their tied portion anchored on the clamps 79, and when a desired length of the strip assemblage has been wound in the channel 78 of the pan the assemblage is severed and the trailing ends of the strips are tied together and anchored upon the clamp 80, the latter being set at such position upon the flange 77 as to avoid slack in and preferably slightly tension the strip assembly.

The pan 76 with the assembly therein and with a submerging quantity of the adhesion-preventing material received therein from the trough 81 is removed from the standard 75 and the strips are vulcanized while they remain submerged in the adhesion-preventing liquid in the pan, as by enclosing a number of the loaded pans in a steam chamber and admitting steam thereto.

The operation of the cutter as described may be continuous, successive pans being filled with successive lengths cut from the continuous strip assembly in the case of unvulcanized rubber. In the case of vulcanized strips, the strips may be reeled either as an assembly or individually, as they pass from the cutter, and either upon the flange 77 of the pan 76 as a reel, or upon such other form of reel as may be desired. The use of the adhesion-preventing material is of course unnecessary in the case of vulcanized rubber.

When the rubber is to be chilled or frozen to facilitate the cutting as above described, the stock, wound in the stock roll 48, may be refrigerated in that form before it is brought to the machine. In such procedure, however, further refrigeration preferably is applied to it progressively by means of the coil 51 or the nozzles 53, 54, or by both, as the stock passes to the cutter, to prevent excessive warming of the stock before the cutting operation. Alternatively the stock, without previous refrigeration, may be chilled or frozen as described, by progression along the sheet as it passes to the cutter. In either case the stock preferably is caused or permitted to thaw out or absorb sufficient heat to have suitable increased flexibility as it passes to the reeling means.

The chilling and consequent stiffening of the stock avoids deformation of the stock by the cutter disks and the other feeding devices, and the true-shearing form and action of the disks permits the stiff stock to be forced without deformation into the spaces between the disks, for the shearing and spacing apart of the strips as above described.

The procedure and apparatus are such that strips of any desired length may be obtained and the cutting may be performed simultaneously and in the same operation with the coiling or reeling of the cut strips, as distinguished from the cutting of the stock as a separate operation, in the practice heretofore commonly followed in cutting golf ball thread from a sheet wound on a drum.

When the strips are cut in unvulcanized condition and subsequently vulcanized while submerged in an aqueous medium such as that described, the cut corners of the strip become somewhat rounded or dulled in the vulcanizing of the strip, which results in a strip less subject to breakage under tension than a strip cut after vulcanization, in which the sharply cut corners or edges have the disadvantage that defects therein initiate transverse tears in the strip under tension.

The apparatus is of simple and inexpensive construction and adapted for ready substitution of the cutter disks and spacer disks in case of wear, and a true-shearing structure and operation is provided such as to avoid dulling of the shearing edges of the disk and also to avoid the binding of the resilient stock against the cutter such as occurs in forcing a beveled cutter into the sheet.

Various modifications are possible within the scope of my invention as defined in the appended claims.

I claim:

1. The method of forming articles from rubber in continuous strip form which comprises refrigerating the strip of rubber by progression along the strip and cutting the refrigerated strip by progression along the same.

2. The method of forming strips from a sheet of rubber which comprises refrigerating the sheet and, by progression along the sheet, shearing the sheet concurrently along a plurality of lines of shear to form a plurality of strips in excess of two, alternate strip-forming zones of the sheet being forced without substantial distortion in opposite directions substantially normal to the sheet.

3. The method of forming strips from a sheet of rubber which comprises refrigerating the sheet and, by progression along the sheet, shearing the sheet concurrently along a plurality of lines of shear to form a plurality of strips in excess of two, alternate strip-forming zones of the sheet being forced without substantial distortion in opposite directions substantially normal to the sheet, applying an adhesion-preventing material to the strips while they are in their resulting spaced-apart condition, and thereafter bringing the strips progressively into closer association with each other.

4. The method of forming strips of vulcanized rubber which comprises refrigerating a sheet of unvulcanized rubber by progression along the sheet, shearing the sheet by progression concurrently along a plurality of lines of shear to form a plurality of strips in excess of two, alternate strip-forming zones of the sheet being forced, in a true shearing action, in opposite directions substantially normal to the sheet, applying an adhesion-preventing material to the strips while they are in their resulting spaced-apart condition, thereafter bringing the strips progressively into closer association with each other and vulcanizing them in such association.

In witness whereof I have hereunto set my hand this 18th day of July, 1927.

JOHN R. GAMMETER.